United States Patent [19]

Katz et al.

[11] Patent Number: 4,545,998
[45] Date of Patent: Oct. 8, 1985

[54] MULTI-PHASE LIQUID SOLVENT DECAFFEINATION

[75] Inventors: Saul N. Katz, Monsey, N.Y.; Ronald H. Skiff, Harrison, N.J.

[73] Assignee: General Foods Corporation, White Plains, N.Y.

[21] Appl. No.: 192,283

[22] Filed: Sep. 30, 1980

[51] Int. Cl.$^4$ ............................................. A23F 5/22
[52] U.S. Cl. .................................. 426/424; 426/427; 426/428
[58] Field of Search .................. 426/424, 427, 428

[56] References Cited

U.S. PATENT DOCUMENTS 4,113,886  9/1978  Katz .................................. 426/428 X
4,366,179  12/1982  Nawata et al. ............................ 426/

FOREIGN PATENT DOCUMENTS 166486  4/1934  Switzerland .
1516208  6/1978  United Kingdom ................ 426/424

OTHER PUBLICATIONS

Sivetz, Coffee User's Guide, 1963, Coffee Publications: Box 455, San Aurelmo, California, pages.
Chemical Abstracts, 4 63, (1910), C. Kippenberger, "New Ideas on the Production of Food Low in Caffeine and Theine, with a Discussion of the Patent Law of Apr. 7, 1901."
C. Kippenberger, Neue Hinweise zur Gewinnung Coffein–bzw. Teinarmer Lebensmittel, Nebst Erorterungen zum Patentgesetz vom. 7, Apr. 1891. *Zeitschrift fur Angewandte Chemie*, vol. 22, pp. 1837–1841, No. 38, Sep. 17, 1909.
Chemical Abstracts, 38 5608, (1944), Luiz Ribeiro Guimaraes, "The Solubility of Caffeine in Coffee Oil", Rev. quim. ind. (Rio de Janiero), 13, No. 143, 26, (1944).
Luiz Ribeiro Guimaraes, "Solubilidade da Cafeina No Oleo de Cafe", Revista de Quimica Industrial, Mar. 1944, p. 26.

*Primary Examiner*—Joseph Golian
*Attorney, Agent, or Firm*—Basam E. Nabulsi; Thomas A. Marcoux; Daniel J. Donovan

[57] ABSTRACT

The process disclosed herein decaffeinates an aqueous caffeine feed solution by contacting it with a multiphase extractant which comprises a continuous phase of a liquid, water-immiscible, caffeine-specific solvent and discontinuous aqueous phase dispersed therein. The caffeine is selectively extracted from the aqueous feed solution, leaving the solubles necessary for a good testing beverage due to the high combined selectivity of the extractant phases. Very low solvent-to-extract ratios are possible because the multi-phase extractant has a much improved partition coefficient as compared to the water-immiscible solvent.

1 Claim, No Drawings

MULTI-PHASE LIQUID SOLVENT DECAFFEINATION

Technical Field

The present invention relates to decaffeination, and more particularly to an improved process for decaffeinating an aqueous caffeine solution by contacting it with an improved extractant.

The prior art has long sought a process which can effectively and non-destructively remove caffeine from aqeous solutions, especially vegetable extracts from tea, coffee, and the like. Unfortunately, all of the known procedures have at least two common problems. First, they add cost to the final product, and it would be desirable to reduce that cost as much as possible. Secondly, they all affect the flavor and quality of the final product by either altering the chemical profile of the natural ingredients or possibly by leaving minor residues. Therefore, it would be desirable to provide an alternative procedure which is more economical than known technology for producing products of like or improved flavor and quality.

BACKGROUND ART

Decaffeination by commercial techniques often involves solvent extraction from whole green beans such as described by Patel et al. in U.S. Pat. No. 3,671,263 who use a chlorinated hydrocarbon solvent, and by Berry et al. in U.S. Pat. No. 2,309,092, who initially use a caffeine-deficient solution of coffee solubles which must then be contacted with a solvent similar to those described by Patel et al. Also of commercial importance is the extraction of caffeine from aqueous solutions with a water-immiscible solvent as described by Adler et al. in U.S. Pat. No. 2,933,395. However, each of these procedures affect the quality of the beverage.

Recently, there has been an effort made to enable the use of alternative solvents or eliminate the need for solvent/product contact. For example, in U.S. Pat. No. 4,113,886, one of us discloses that a selective membrane can be employed to effect separation. According to this patent, aqueous vegetable extracts such as those from tea or coffee are decaffeinated by causing the caffeine to diffuse through at least one porous, hydrophilic membrane and a water-immiscible solvent phase into a water phase. While this procedure does eliminate contact between the solvent and the ultimate carrier for the caffeine, namely the water phase, the rate of decaffeination is greatly limited by the relatively large surface areas required for the membranes, and the high cost of providing them.

In another approach disclosed in Belgian Pat. No. 835,556, caffeine-containing vegetable materials or extracts therefrom are contacted with liquid, water-immiscible fatty extractants at ratios of liquid extractant to caffeine solution of at least about 20:1. These high volumes of extractant seriously detract from the commercial utility of such a process. The disclosure indicates that solid vegetable materials, such as green coffee beans, can be more effectively extracted when moistened, especially when the extractant contains an amount of moisture sufficient to prevent loss of moisture from the vegetable material. It also indicates, however, that when liquid caffeine-containing extracts are to be decaffeinated, the extractant should be dried prior to contact with the liquid. Moreover, it is preferred according to that disclosure to dry the extractant after the renewal process whether solid or liquid caffeine-containing materials are being extracted. Where solid materials are being extracted, the equilibrium amount of moisture is added as fresh water in measured quantities. The disclosure further indicates that the moisture content should be kept at the lowest level necessary because non-caffeine solids are also extracted.

Thus, the prior art attempts with alternative liquid extractants and avoidance of contact between the caffeine-containing material and the extractant, present serious problems in terms of cost where production on a commercial scale is desired. Accordingly, there is a present need for improvement by means of an alternative process for decaffeination.

DISCLOSURE OF INVENTION

The present invention provides an improved method for decaffeinating an aqueous caffeine-containing solution wherein the aqueous solution is contacted with an extractant for a time sufficient for at least a portion of the caffeine to be extracted from the aqueous solution and taken up by the extractant, and the aqueous solution is separated from the extractant, wherein the improvement comprises: employing an extractant comprising a continuous phase of a liquid, water-immiscible, caffeine-specific solvent and a discontinuous aqueous phase dispersed therein.

The process is useful for removing caffeine from any caffeine-containing solution, but finds its primary utility for decaffeinating aqueous vegetable extracts such as coffee and tea. Because of the high specificity for caffeine exhibited by the extractant of the present invention, the coffee extracts can be from green or roasted beans.

Where the extract is from roasted coffee, it is preferred to strip and collect volatile flavor and aromas from the aqueous extract before contacting the extract with the extractant for removing the caffeine. Then, the decaffeinated extract can be combined with collected volatiles and dried to soluble powder form as described in U.S. Pat. No. 2,933,395 to Adler et al. There are envisaged, however, products for which this will not be necessary and alternative processes wherein the volatiles can be removed from the extractant.

The liquid, water-immiscible, caffeine-specific solvent screens out the majority of soluble solids other than caffeine which are present in the feed solution, while permitting the caffeine to pass through to the aqueous phase where it is dissolved and held. An advantage of the present invention is that the selectivities of the water-immiscible solvent and the aqueous phase are additive and tend to be more selective when combined than either would be separately. Thus, where the water in the aqueous phase is saturated with the other soluble materials present in aqueous caffeine-cotaining solution, the aqueous phase becomes very selective toward caffeine while still being capable of holding large quantities of caffeine.

Selection of the proper combination of water-immiscible solvent, aqueous phase composition; and conditions of contact is important to maintain the most effective driving force and rate of decaffeination. Additionally, it is important to employ the greatest proportion of water dispersed within the water-immiscible solvent as is consistent with stability of the multi-phase extractant, minimal dilution of the aqueous caffeine-containing solution, and separation of the various different phases from one to another. Typically, water will comprise from about 0.5 to about 50% of the weight of the extractant; preferably, the level of water will be within the range of from about 1 to 10%, with levels of less than 5% being most preferred. Where necessary, minor amounts of food-acceptable emulsifiers can be employed to obtain the limited stability required of the multi-phase extractant during processing.

The water-immiscible, caffeine-specific solvent must be liquid under the proposed processing conditions and must be immiscible in the aqueous caffeine-containing feed solution. It is important for the solvent to be liquid so that the extractant can be more easily handled without causing phase operation. Moreover, the use of a solvent in the liquid state increases the rate of transfer of the caffeine therethrough for dissolution in the aqueous phase of the extractant. The quality of immiscibility is essential so that the solvent is not dissolved in the aqueous caffeine-containing solution in any amount which would have a significant impact on the flavor or quality of the final product. Preferably, the liquid, caffeine-specific solvent is sufficiently immiscible to prevent any measurable amount of it to be dissolved in the aqueous caffeine-containing solution.

Among the materials which can be employed as the liquid, water-immiscible, caffeine-specific solvent according to the present invention are petroleum oil, triglycerides, fatty acids, fatty alcohols, and other caffeine selective, water-immiscible materials which are liquid at the conditions of treatment. The triglycerides can be derived from vegetable or animal sources. Among the suitable triglycerides are the usual vegetable fats typically encountered in food processing such as soy bean oil, corn oil, coconut oil, cotton seed oil, peanut oil, safflower oil, palm kernel oil, sunflower oil, palm oil, rapeseed oil, coffee oil, and mixtures of these. It is preferred that the water-immiscible caffeine specific solvent have a partition coefficient of at least 0.05, and more preferably greater than about 0.1. It is an advantage of the invention, however, that solvents with partition coefficients below these levels can be employed more efficiently than heretofore. It is also preferred in some embodiments, especially where higher proportions of water are dispersed within the water immiscible solvent, to employ vegetable fats containing elevated levels of natural emulsifying materials such as mono- and di-glycerides.

While animal fats such as tallow, chicken fat, lard and butter fat can conceivably be employed, they contain large amounts of impurities which are costly to remove. Therefore, they are not preferred. Among the suitable petroleum oils are mineral oils known to the art as light mineral oils. These oils are desirable because they have good stability. Among the fatty acids are oleic acid, stearic acid, octanoic acid, and the like. In general, the longer chain acids will be preferred within this group. Similarly, longer chain fatty alcohols, such as stearyl alcohol are preferred within that group.

The aqueous phase which is dispersed within the liquid, water-immiscible, caffeine-specific solvent in the extractant according to the present invention, is preferably saturated with all of the non-caffeine soluble solids which are present within the aqueous caffeine-containing solution. It is preferred also, however, to maintain a low enough concentration of caffeine within the aqueous phase to maintain an effective driving force for the decaffeination. Typically, the caffeine concentration of the aqueous phase of the extractant should be maintained at a level of less than about 0.1% and should preferably be maintained at a level of about 0.02%. Because the aqueous phase of the extractant has a high capacity, on the order of about 10, for holding caffeine within solution, a relatively small amount of water, on the order of that previously discussed, can be employed. When the caffeine concentration within the aqueous phase reaches a level of above about 0.1%, the extractant should be cycled to a renewal stage for reduction of the caffeine content.

Also important to the successful operation of the present invention is the size of the droplets of the aqueous phase within the continuous water-immiscible solvent phase. Typically, particle sizes of from about 1 to 40 microns will be stable during most conditions of decaffeinating contact. It is, of course, possible that other droplet sizes will be preferred in certain processing configurations. The need for or the desirability of emulsifying additives will also play an important role on the size of the droplet sizes. However, the use of an emulsifier is desired only where it does not adversely affect the ability to separate the dispersed aqueous phase from the continuous water-immiscible solvent phase during renewal of the extractant.

The extractant is renewed by separating the dispersed aqueous phase from the continuous phase comprising the water-immiscible, caffeine specific solvent. This may be accomplished ordinarily by simply permitting the natural coalescence of the water phase and the separation based upon density, after removal from the turbulent conditions of contact with the caffeine-containing solution to a non-turbulent separation zone. The caffeine content of the aqueous phase can be reduced in any effective manner prior to reuse where desired. In other circumstances, however, it may be desired to discard the aqueous phase and start with a fresh charge of water to prepare a renewed extractant.

The liquid, water-immiscible, caffeine-specific solvent need not be renewed by any particular treatment, because it is not the caffeine-holding capacity of the solvent, but simply its ability to dissolve caffeine with good specificity, which is important. Accordingly, it is an advantage of the present invention that only a minor portion of the total extractant need be renewed prior to recycling to the process.

The decaffeination procedure is accomplished by contacting the extractant with the caffeine-containing solution under conditions effective to extract at least a portion of the caffeine therefrom, and to cause it be taken up by the extractant. This is preferably accomplished by either one of two generalized techniques. According to one technique, a two-phase solvent containing less than about 5% of a loosely dispersed aqueous phase is vigorously contacted with the caffeine containing aqueous solution in a liquid-liquid contact apparatus such as a rotating disk contactor. According to this technique, there is typically no added emulsifier to maintain the aqueous phase dispersed within the water-immiscible solvent continuous phase. According to a second technique, higher levels of aqueous extractant phase are maintained more tightly emulsified within the liquid, water-immiscible, caffeine-specific solvent continuous phase of the extractant by the use of added emulsifiers. According to this technique, droplets of the water-in-oil emulsion are contacted with the caffeine-containing aqueous solution being treated.

According to the first technique, small quantities of water or other aqueous solution to be employed as the aqueous phase of the extractant are metered into the water-immiscible solvent just prior to entry to the liquid-liquid extractor. The aqueous phase is preferably formed into droplets before metering. The largest droplets formed should have a free-fall velocity equal to or smaller than the superficial velocity of the bulk extractant through the extractor. This criteria favors entrainment of the droplets within the water-immiscible solvent. Coalescence is minimized where the droplet size is small enough and the flow within the extractor is sufficiently turbulent. A slight degree of coalescing may be tolerable. In the exemplary situation of a Karr agitated column, wherein superficial velocities are on the order of from about 0.6 centimeter/second the maximum droplet diameters for liquids of various viscosities are as follows:

| Viscosity (Centipoise) | Maximum Diameter (mm) | Solvent |
| --- | --- | --- |
| .2 | 0.11 | Hexane |
| 2 | 0.35 | Corn oil, 80° C. |
| 20 | 1.1 | Corn oil, 25° C. |

Droplets of this size can be formed either by mechanical agitation, as in a homogenizer of conventional construction, or by condensation of steam by the cool solvent. The latter of these two procedures is preferred. Droplets of this size are visible and appear in the water-immiscible solvent as a cloud.

An advantage of the present invention is that even minor amounts of dispersed aqueous phase draw great quantities of caffeine from the liquid water-immiscible, caffeine-specific solvent and increase the apparent partition coefficient of the solvent. For example, typical values of partition coefficients for vegetable oils run as low as 0.005. The following table, based on weight, illustrates the major degree of improvement which can be achieved for the apparent partition coefficient exhibited by the extractant and the proportionate decrease in the solvent-to-extract ratio necessary to achieve 97% decaffeination.

| Water Dispersed in Solvent (%) | Apparent Partition Coefficient | Improvement (%) | Minimum Solvent to Extract Ratio |
| --- | --- | --- | --- |
| 0 | 0.005 | 0 | 200 |
| .5 | 0.00998 | 99 | 100 |
| 1.0 | 0.01495 | 199 | 67 |
| 1.5 | 0.01993 | 298 | 50 |
| 2.0 | 0.0249 | 398 | 40 |
| 5.0 | 0.055 | 995 | 18 |

Thus, it can be seen that very minor amounts of water when employed for the purpose of acting as a caffeine sink, can replace great amounts of water-immiscible, caffeine solvent normally required. In the case shown above where 5% water is added to the water immiscible solvent, an emulsifier will normally be employed.

The temperature employed during the extraction of the caffeine from the aqueous caffeine-containing feed solution will affect the rate of the extraction and the stability of the dispersion. Therefore, it is not possible to identify a single temperature or range of temperatures as universally defining optimum conditions. It is believed, however, that temperatures within the range of from about 25° to 100° C. will provide good results. The selection of an exact temperature will depend upon the materials and processing equipment and conditions employed and may be within or outside of this range.

BEST MODE FOR CARRYING OUT THE INVENTION

The following examples are provided to illustrate and explain what is presently considered the best mode for carrying out the invention. The data is for illustrative purposes, to guide the person of ordinary skill in the art and is not to be taken as limiting in any regard. Unless otherwise indicated, all parts and percentages are by weight.

EXAMPLE 1

A green coffee extract is prepared by the method described in Berry et al. in U.S. 2,309,092 and is contacted with an extractant of the following composition to prepare partially decaffeinated extract:

| Ingredient | Amount (grams) |
| --- | --- |
| Oleic acid | 450 |
| Methanol | 50 |
| Water | 100 |
| Potassium Oleate | 0.9 |
| Polyethylene Glycol (MW 6000) | 2.0 |

These ingredients are emulsified by mixing for about three minutes in a Waring Blendor at the highest speed. The oleic acid forms a continuous external phase with an aqueous phase dispersed therein. This extractant is fed to a simple bubble contactor at a rate of 1.5 ml/minute until 100 ml of the extractant has bubbled through 50 ml of extract. At these rates, there is no discernible emulsification between the feed extract and the extractant emulsion. The level of caffeine is reduced to a level of 0.83% in the final extract from a level of 1.2% in the feed extract, giving a degree of decaffeination of 33%. The degree of decaffeination is good considering the solvent to extract ratio is only 2 to 1 and the apparatus employed is very simple.

EXAMPLE 2

According to this example, an extractant containing a low level of dispersed water and no added emulsifier is contacted with a green coffee extract. Green coffee extract is contacted with dry corn oil at 82° C. at a ratio of 40 to 1 oil to extract for 97% decaffeination. However, with water at 2% homogenized into the oil only 25 to 1 oil/water multi-phase extractant to green coffee extract is required for 97% decaffeination.

The above description is presented for the purpose of teaching people of ordinary skill in the art how to practice the invention. The description is not meant to detail all of the obvious modifications and variations of the invention which will become apparent to the skilled worker upon reading. It is intended, however, that al of these modifications and variations be included within the scope of the invention which is defined by the following claims.

Claims

1. An improved method for decaffeinating an aqueous caffeine-containing solution wherein the aqueous solution is contacted with an extractant for a time sufficient for at least a portion of the caffeine to be extracted from the aqueous solution and taken up by the extractant, and the aqueous solution is separated from the extractant, wherein the improvement comprises: employing an extractant comprising a continuous phase of a liquid, water-immiscible, caffeine-specific solvent and a discontinuous aqueous phase dispersed therein, wherein the discontinuous aqueous phase of the extractant is saturated with all non-caffeine soluble solids present in the aqueous caffeine-containing solution.

* * * * *